United States Patent Office 3,711,554
Patented Jan. 16, 1973

3,711,554
4-HYDROXY-3,5 DITERTIARY PHENONES
Manfred Engelhardt, Wolfgang Fruhstorfer, Reiner Hesse, Bernd Dennler, and Wilhelm Baumer, Darmstadt, Germany, assignors to E. Merck A.G., Darmstadt, Germany
No Drawing. Filed Nov. 25, 1969, Ser. No. 879,922
Claims priority, application Germany, Nov. 28, 1968,
P 18 11 322.9
Int. Cl. C07c 49/82
U.S. Cl. 260—591                    17 Claims

ABSTRACT OF THE DISCLOSURE

Stabilizers, for plastics, oils and fats, of the formula

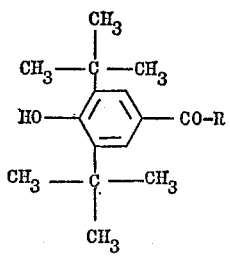

I wherein R is alkyl of 4 to 25 carbon atoms; alkyl of up to 25 carbon atoms in which one or more of the methylene groups are replaced by —O—, —S—, —NR$_1$— and/or CO; morpholino-alkylene wherein the alkylene bridge contains 1 or 2 carbon atoms; cyclohexyl or cyclopentyl unsubstituted or substituted with —R$_1$, —OR$_1$, —SR$_1$ or —NR$_1$R$_2$; or phenyl which is mono- or polysubstituted with alkyl of 1 to 18 carbon atoms, —OR$_1$, —SR$_1$ or —NR$_1$R$_2$; or aralkyl whose alkyl portion contains from 1 to 10 carbon atoms and in which one or more CH$_2$-groups can be replaced by —O—, —S—, —NR$_1$— and/or CO, and whose aryl portion can be mono- or polysubstituted by —R$_1$, —OR$_1$, —SR$_1$ and/or —NR$_1$R$_2$; can be produced by reacting 2,6-di-tert.-butyl-phenol with an acid derivative of the formula R—CO—X wherein X is —O—CO—R' or halogen, R' being R or R$_1$, in the presence of a Lewis acid, e.g., AlCl$_3$ or TiCl$_3$.

BACKGROUND OF THE INVENTION

This invention relates to 4-hydroxy-3,5-di-tert.-butyl-phenones and to their use as stabilizers for plastics, oils and fats.

Many organic compounds employed in industry withstand the conditions of their industrial usage without a drastic reduction in or loss of technologically important properties for a satisfactory period of time only when stabilizers are added thereto which inhibit or prevent such changes. Stabilizers play an important part, for example, in the technology of the plastics and lubricants. In the macromolecular plastics, stabilizers are used to inhibit, in particular, the effect of oxygen, heat, and light, which reactions have a disadvantageous influence on the strength, elasticity, or toughness of the products. In lubricants, similar reactions generally exert a disadvantageous effect on viscosity and lubricity.

Phenolic stabilizers have been employed to protect against the damaging effects of oxygen, heat, and light as well as the thioethers, organometallic compounds and the organophosphor compounds.

In the class of phenolic stabilizers, those which are substituted on the aromatic nucleus with bulky alkyl groups have gained a considerable technical importance. For example, U.S. Pat. No. 2,903,487 teaches the use of 4-hydroxy-3,5-di-tert.-butyl-acetophenone, 4-hydroxy-3,5-di-tert.-butyl-propiophenone, 4-hydroxy-3,5-di-tert.-butyl-benzophenone, and 2,6-di-tert.-butyl-4-crotonyl-phenol as stabilizers. However, these compounds only partially meet the requirements to be satisfied by stabilizers. For example, the degradation of thermoplastics and/or cross-linking reactions caused by oxygen and/or heat are inhibited to an unsatisfactory degree. Furthermore, these compounds cause undesirable discolorations of objects in which they are incorporated when the objects are subjected to high thermal stress, intense light or ultraviolet radiation.

It has now been discovered that the compounds of this invention are markedly superior as stabilizers in various respects compared with conventional phenolic stabilizers.

SUMMARY OF THE INVENTION

According to this invention, plastics, fats and oils are stabilized by novel 4-hydroxy-3,5-di-tert.-butyl-phenones of Formula I:

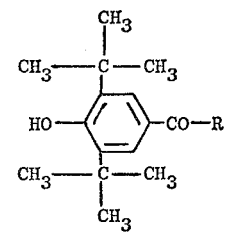

I wherein R is a straight-chain or branched alkyl of 4 to 25 carbon atoms, or alkyl of up to 25 carbon atoms in which at least one methylene (—CH$_2$—) group thereof is replaced by —O—, —S—, —NR$_1$— and/or CO, i.e., alkyl groups containing up to a total of 25 methylene and oridging groups; morpholino-alkylene wherein the bridging alkylene group contains 1 to 2 carbon atoms; cyclohexyl or cyclopentyl, which can be mono- or disubstituted by —R$_1$, —OR$_1$, —SR$_1$ and/or NR$_1$R$_2$; phenyl which can be mono- or polysubstituted by alkyl of 1 to 18 carbons atoms, —OR$_1$, —SR$_1$ and/or —NR$_1$R$_2$; or aralkyl in which the alkyl portion contains 1 to 10 carbon atoms, which can be straight chain or branched, one or more CH$_2$-groups of which can be replaced by —O—, —S—, —NR$_1$— and/or CO, and the aryl portion of which can be mono- or polysubstituted by R$_1$, OR$_1$, SR$_1$ and/or NR$_1$R$_2$, wherein R$_1$ and R$_2$, which can be identical or different, in each instance is H or alkyl of up to 18 carbon atoms, which can be straight chain or branched.

It is an object of thise invention to provide novel 4-hydroxy-3,5-di-tert.-butyl-phenones of Formula I. Another object is stabilization of plastics, oils, and fats with compounds of Formula I.

Other objects will be apparent to those skilled in the art to which this invention pertains.

DETAILED DESCRIPTION OF THE INVENTION

The residue R in the compounds of Formula I can be, for example, a linear or branched alkyl group of 4 to 25 carbon atoms, e.g., n-butyl, isobutyl, sec.-butyl, tert.-butyl, n-amyl, isoamyl, neopentyl, n-hexyl, isohexyl, heptyl, octyl, nonyl, decyl, undecyl, dodecyl, tridecyl, tetradecyl, pentadecyl, hexadecyl, heptadecyl, octadecyl, nonadecyl, eicosyl, as well as the isomers of these compounds and the higher homologs thereof containing up to 25 carbon atoms.

When R is alkyl of up to 25 carbon atoms, which can be linear or branched, and at least one CH$_2$-group is replaced by —O—, —S—, —NR$_1$— and/or CO, ordinarily, at most six methylene groups and preferably one, two, or three, are replaced by the above-mentioned groups. If two or three methylene groups adjacent to each other are replaced by one or more of the above-mentioned groups, the following combinations are to be taken into consideration: —S—S—(disulfides); —NR₁—NR₁— (hydrazines); —CO—O— (carboxylic acids and esters thereof); —CO—NR₁ (carboxylic acid amides); —CO—S— (thiocarboxylic acids and esters thereof);

—CO—NR₁—NR₁—

(carboxylic acid hydrazides); —CO—CO (diketones); and —CO—O—CO (carboxylic acid anhydrides). In no case, more than three methylene groups adjacent to each other are replaced.

Examples of alkyl groups wherein one CH₂-group thereof has been replaced by an oxygen atom are 2-oxapropyl, 2- or 3-oxabutyl, 2-, 3-, or 4-oxa-amyl, 4-methyl-3-oxa-amyl, 4,4-dimethyl-3-oxa-amyl, 2-, 3-, or 4-oxahexyl, 2-, 3-, or 4-oxoheptyl, 2-, 3-, 4-, or 5-oxaoctyl, 3-, 4-, or 5-oxanonyl, 3-, 4-, or 5-oxadecyl, 3-, 4-, or 5-oxaundecyl, 3-, 4-, 5-, or 6-oxadodecyl as well as the isomers and higher homologs thereof containing up to 25 carbon atoms, wherein one of the methylene groups in the 2-, 3-, 4-, 5-, or 6-position is replaced by an oxygen atom.

Examples of thioether R groups are, in particular, 3-thia-butyl, 3-thia-amyl, 3-thiahexyl, 3-thiaheptyl, 3-thiaoctyl, 3-thiadodecyl, 3-thiapentadecyl, and 3-thiaoctadecyl, and furthermore also those which contain in the chain, in addition to the thiasulfur atom, an oxygen and/or a carbonyl group, for example, the methyl, ethyl, propyl, butyl or amyl ester of 3-thiacaproic acid.

Examples of alkyl residues wherein 2 or 3 adjacent methylene groups are replaced by the above groups are, in particular, carboxylic acids and the derivatives thereof, e.g., esters, anhydrides, amides and hydrazides. Examples of such R groups are acetoxymethyl, 2-acetoxyethyl, 3-acetoxypropyl, 2 - propionyloxyethyl, 3 - propionyloxypropyl, carbomethoxymethyl, carbethoxymethyl, carbethoxyethyl, carbethoxypropyl, as well as higher homologs thereof, which can also be branched and can contain further hetero-atoms, such as, for example, 1-carbethoxy-3-oxa-amyl-(2).

R can also be bound to the benzoyl portion of the compounds of this invention by a carbalkoxy (—CO—O—) group. Examples of such groups are ethoxycarbonyl, propoxycarbonyl, butoxycarbonyl, heptoxycarbonyl, octoxycarbonyl, nonyloxycarbonyl, decyloxycarbonyl, undecyloxycarbonyl, dodecyloxycarbonyl, tridecyloxycarbonyl, hexadecyloxycarbonyl, heptadecyloxycarbonyl, octadecyloxycarbonyl, and nonadecyloxycarbonyl.

When R represents a mono- or di-substituted cyclohexyl group, any substituents thereon are preferably at the 2-, 4- and/or 6-positions. Examples for such groups are 2- and 4-alkylcyclohexyls, e.g., 2-methylcyclohexyl, 2- and 4-alkoxycyclohexyls, e.g., 4-methoxycyclohexlyl, 2- and 4-alkylthiocyclohexyls, e.g., 4-methylmercaptocyclohexyl, and 2,4-dialkylcyclohexyls, 2,6-dialkylcyclohexyls, 2,4-dialkoxycyclohexyls, 2-alkyl-4-alkoxycyclohexyls, and 2-alkyl-4-alkylthiocyclohexyls, wherein these alkyl, alkoxy and alkylthio residues contain 1–18 carbon atoms, e.g., methyl, methoxy and methylmercapto.

When R represents a cyclopentyl group, the cyclopentyl group can be unsubstituted or substituted by one or more alkyl, alkoxy, or alkylthio groups, e.g., methyl, methoxy or methylmercapto, e.g., at the 2-, 3-, 2,3- or 3,4-positions.

In the compounds of this invention R can also represent a mono- or polysubstituted phenyl group. Ordinarily, such substituted phenyl groups contain at most three substituents, and generally no more than two different types of such substituents. Examples of such R groups are o-, m- and p-tolyl, o-, m- and p-ethylphenyl, o-, m- and p-propylphenyl, o- and p-cumyl, o-, m- and p-tert.-butylphenyl, o-, m- and p-amyl-, isoamyl- and neopentylphenyl, o-, m- and p-hydroxyphenyl, o-, m- and p-hydroxyphenyl substituted by one or two alkyl groups, e.g., methyl in the o-, m- or o,o'-positions, o-, m- and p-aminophenyl, as well as o-, m- and p-aminophenyls mono- or disubstituted by alkyl, preferably lower-alkyl, on the nitrogen atom and/or on the nucleus, e.g., p-aminophenyl, p-methylaminophenyl, p-dimethylaminophenyl and o, o'-dimethyl-p-dimethylaminophenyl.

Of the compounds of Formula I wherein R is an aralkyl group, preferred are those wherein the alkyl portion of the aralkyl group is a straight chain which does not contain an —O—, —S—, —NR₁— or CO group, or, if it does, it contains at most three of these substituents and the aryl portion is phenyl or substituted phenyl. Examples of such groups are benzyl, 2-phenylethyl, 3-phenylpropyl, 4-phenylbutyl, 2 - (4' - methoxy-3',5'-di-tert.butylphenyl)-ethyl, 2-phenyl-2-oxaethyl, 2-phenyl-2-thiaethyl, 2-phenyl-2 - azapropyl, 5-(4'-hydroxy-3',5'-di-tert.-butylphenyl)-5-oxo-n-amyl, 6(4-hydroxy-3',5'-di - tert-butylphenyl) - 6-oxo-3-thiahexyl, and 2-p-tert-butylphenylethyl.

The compounds of this invention are useful as stabilizers for the stabilization of plastics, fats, and oils. Plastics which can be stabilized by the compounds of this invention include, in particular, polyolefins, e.g., polyethylene and polypropylene, both high-pressure and low-pressure, and substituted polyolefins, e.g., polystyrene, polyvinyl halogenides, as well as copolymers and mixed polymers of various types. Fats and oils which can be stabilized by the compounds of this invention against degradation by heat and oxygen preferably are fats and lubricants as well as cooling oils and insulating oils (transformer oils).

Generally speaking, the mechanism of stabilization is to prevent the reaction of a peroxide radical initially formed by the attack of oxygen to a molecule of the compound to be stabilized, with a further molecule thereof with hydrogen abstraction, whereby usually a hydrocarbyl radical is formed which easily reacts with molecular oxygen to form another peroxide radical etc. This chain propagation reaction is terminated by abstraction of the hydrogen atom of the phenolic hydroxyl group of the stabilizer molecule, whereby a phenoxy radical is formed which due to its resonance stabilisation is unable to propagate that chain reaction.

Thus, ethylenically unsaturated double bonds are stabilized by the present invention, irrespective of the compound in which they occur. Because α-ethylenically unsaturated double bonds are subject to decomposition by heat and light to an even greater extent than double bonds situated in other than a terminal position of the molecule, the present invention is especially beneficial for the protection of such α-positioned double bonds. Furthermore, the stabilizers can be used to protect molecules having multiple double bonds such as polydiolefins and the like, e.g., polyisoprene, polybutadiene and copolymers thereof with styrene, etc.

The stabilizing effect against the attack of heat and atmospheric oxygen, which can be determined along the lines of DIN [German Industrial Standard] 53,455, on polyethylene test bodies in an elongation-at-rupture test in the presence of air and under thermal stress, which test bodies had been stabilized with compounds of Formula I, is considerably better than is achieved using the compounds of U.S. Pat. 2,903,487. Moreover, the lightfastness achieved with the compounds of Formula I is, in most cases, improved over that of the above-mentioned conventional compounds.

A further valuable property of the novel compounds which makes them particularly suitable for the stabilization of solid plastics, is that they diffuse from these materials to only a minor extent or not at all. This is of special importance when processing the stabilized plastics into products which are exposed to differing temperatures at different points, for example cooling units or conduits.

The compounds of this invention can be employed by themselves or in a mixture with other conventional stabilizers, e.g., light and ultraviolet stabilizers.

For use as stabilizers, the compounds of this invention are added to plastics, oils and fats preferably in amounts of 0.05–10% by weight, more preferably 0.1–3% by weight. In combination with conventional stabilizers, 0.05–5% by weight, preferably 0.1–2% by weight, is sufficient for obtaining a satisfactory stabilizing effect.

The stabilizing effect of the compounds of the present invention can be determined as follows:

Non-stabilized polyethylene powder is kneaded with 0.5% by weight of the stabilizer to be tested in a mixing roll mill for one hour at 140–150° C. in the presence of air, and then pressed into sheets having a thickness of 2 mm. at this temperature and under a pressure of 100 kp./cm.$^2$. From these sheets, test bodies 10 x 50 mm. in size are cut and the elongation at rupture thereof determined (in percent) by a conventional tensile strength testing device.

The results obtained following the above procedure for the compounds known from U.S. Pat. 2,903,487 (Experiments 2–5) and the compounds of Formula I of this invention are compiled in Table I.

The righthand column of Table I contains qualitative data regarding the lightfastness of the stabilizers examined herein. These data were determined by intensively irradiating test bodies, produced as described above, for 180 hours with the light of a xenon high-pressure lamp, the spectral composition of which corresponds, in the visible and ultraviolet ranges, approximately to that of sunlight. Thereafter, the color of the irradiated test bodies was compared to that of otherwise identical test bodies which had not been irradiated.

invention, this portion comprises a lower weight proportion than in the comparable conventional stabilizers. Thus, from the prior art, a lower rather than higher stabilizing effect would be expected of the compounds of this invention.

Furthermore, it can be seen from Table I that, although not all of the compounds of the invention which exhibit a good stabilizing effect are completely lightfast, the discolorations observed under the experimental conditions are, in all cases, less than those caused by the conventional 2,6-di-tert.-butyl-4-crotonyl-phenol or 4-hydroxy-3,5-di-tert.-butyl-benzophenone stabilizers.

The compounds of this invention can be produced by conventional methods. In the preferred process, 2,6-di-tert.-butyl-phenol is reacted with an acid derivative of the formula R—CO—X wherein X is —O—CO—R' or halogen, preferably Cl or Br, R' being R or $R_1$ as defined above, in the presence of a Lewis acid, such as, for example, $AlCl_3$ or $TiCl_4$. Suitable solvents are those customary for Friedel-Crafts syntheses. Well suited are, for example, carbon disulfide or 1,2-dichloroethane. The reaction temperatures ordinarily range between —50° C. and +30° C., between —20° C. and 0° C. being preferred, because in this range, the reaction takes place at a sufficiently rapid rate and the formation of undesired by-products is substantially limited.

In another process, compounds of this invention are obtained by reacting an alkali salt of 2,6-di-tert.-butyl-phenol, which can be produced by reacting 2,6-di-tert.-butyl-phenol with a molar equivalent of an alkali-metal

TABLE I.—ELONGATION AT RUPTURE AND LIGHTFASTNESS OF POLYETHYLENE TEST BODIES

| Experiment Number | Stabilizer | Elongation at rupture (percent) | Lightfastness |
|---|---|---|---|
| 1 | None (control) | 60 | No discoloration. |
| 2 | 4-hydroxy-3,5-di-tert.-butyl-acetophenone | 120 | Do. |
| 3 | 4-hydroxy-3,5-di-tert.-butyl-propiophenone | 160 | Do. |
| 4 | 2,6-di-tert.-butyl-4-crotonylphenol | 150 | Strong brown discoloration. |
| 5 | 4-hydroxy-3,5-di-tert.-butyl-benzophenone | 73 | Yellow-brown discoloration. |
| | Compounds of Formula I, R= | | |
| 6 | —$CH_2$—$CH(CH_3)_2$ | 200 | No discoloration. |
| 7 | —$C(CH_3)_3$ | 390 | Do. |
| 8 | —$C_6H_{11}$ (cyclohexyl) | 315 | Do. |
| 9 | —$(CH_2)_6$—$CH_3$ | 320 | Do. |
| 10 | —$(CH_2)_7$—$CH_3$ | 315 | Do. |
| 11 | —$(CH_2)_{10}$—$CH_3$ | 315 | Do. |
| 12 | —$(CH_2)_{14}$—$CH_3$ | 310 | Do. |
| 13 | —$(CH_2)_{16}$—$CH_3$ | 300 | Do. |
| 14 | —$(CH_2)_{18}$—$CH_3$ | 280 | Do. |
| 15 | —$(CH_2)_{20}$—$CH_3$ | 290 | Do. |
| 16 | —$CH_2$—$CH_2$—$N(CH_3)_2$ | 260 | Slight brownish discoloration. |
| 17 | 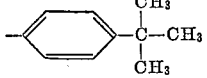 | 390 | Slight yellowish discoloration. |
| 18 | —$CH_2$—$C_6H_5$ | 195 | Light yellow discoloration. |
| 19 | —$CH_2$—$CH_2$—$C_6H_5$ | 340 | No discoloration. |
| 20 | 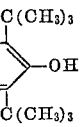 | 250 | Slight brownish discoloration. |
| 21 | —$CH_2$—$CH_2$—O—$CH_3$ | 330 | No discoloration. |
| 22 | —$COOC_8H_{17}$ | 300 | Very slight yellowish discoloration. |
| 23 | —$COOC_{12}H_{23}$ | 330 | Do. |
| 24 | —$COOC_{18}H_{37}$ | 360 | Do. |

The data of Table I demonstrate that the test bodies of polyethylene stabilized with the compounds of this invention can be exposed, after the thermal stress (during incorporation of the stabilizer and pressing into a sheet), to a mechanical load which is one-and-a-half to four times greater than test bodies of polyethylene stabilized with conventional stabilizers. This result is especially surprising, because the stabilizing properties of phenol derivatives are generally attributed only to the phenolic portion of these molecules. However, in the compounds of this lower-alcoholate, in an inert solvent, such as, for example, diethyl ether, tetrahydrofuran, dioxane, benzene, toluene, xylene or petroleum ether, with an acid derivative of the formula R—CO—X, wherein R and X have the values given above, at a temperature from about —20° C. to +120° C., preferably between room temperature and +90° C.

Compounds of this invention can also be prepared by converting the —$CH_2$— group adjacent to the aromatic ring in compounds of Formula II

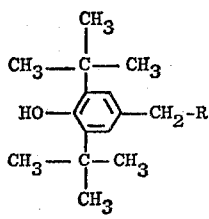

wherein R has the value given above, into a —C(Hal)₂— group in which Hal is Cl or Br, in a conventional manner, e.g., by direct halogenation, and thereafter saponifying the thus-obtained geminate dihalogenide to produce a carbonyl group. Of course, in this process, only those compounds can be employed whose R group is not altered in an undesired manner under the halogenation and saponification conditions.

Compounds of Formula I can also be obtained by converting, in other compounds of Formula I, the residue R into a different residue R in accordance with conventional methods, e.g., esterification, saponification, alkylation, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In these examples, the temperatures are set forth in degrees centigrade.

Example 1

With cooling to —15°, 30 g. of stearoyl chloride is gradually added to a suspension of 13.4 g. of anhydrous AlCl₃ in 100 ml. of thoroughly dried 1,2-dichloroethane. The reaction mixture is stirred at this temperature for 15 minutes, and then a solution of 20.5 g. of 2,6-di-tert.-butyl-phenol in 50 ml. of 1,2-dichloroethane is added dropwise over a period of one-half hour, the temperature being maintained between —10 and —20° C. Thereafter, the mixture is stirred for one hour while the temperature is allowed to rise gradually to about 0°. The reaction mixture is poured into one liter of ice water acidified with hydrochloric acid. After separating the organic phase, the aqueous solution is shaken twice with 100 ml. portions of 1,2-dichloroethane. The combined organic phases are washed until neutral with an aqueous solution of sodium bicarbonate, dried over sodium sulfate, and evaporated. There remains 43 g. of 4-hydroxy-3,5-di-tert.-butylphenyl-heptadecyl-ketone which melts at 62–63° after recrystallization from dioxane.

Analogously, the following compounds are obtained by reaction with the corresponding acyl chloride:

4-hydroxy-3,5-di-tert.-butylphenyl-n-butyl-ketone, M.P. 89–90°;
4-hydroxy-3,5-di-tert.-butylphenyl-isobutyl-ketone, M.P. 110–111°;
4-hydroxy-3,5-di-tert.-butylphenyl-tert.-butyl-ketone, M.P.131–133°;
4-hydroxy-3,5-di-tert.-butylphenyl-neopentyl-ketone;
4-hydroxy-3,5-di-tert.-butylphenyl-cyclopentyl-ketone;
4-hydroxy-3,5-ditert.-butylphenyl-cyclohexyl-ketone, M.P. 126–128°;
4-hydroxy-3,5-di-tert.-butylphenyl-4'-tert.-butyl-cyclohexyl-ketone;
4-hydroxy-3,5-di-tert.-butylphenyl-4'-methoxy-cyclohexyl-ketone, M.P. 115–117°;
4-hydroxy-3,5-di-tert.-butyl-phenyl-2'-methoxy-cyclohexyl-ketone;
4-hydroxy-3,5-di-tert.-butylphenyl-n-heptyl-ketone, M.P. 90–91°;
4-hydroxy-3,5-di-tert.-butylphenyl-n-octyl-ketone, M.P. 83–85°;
4-hydroxy-3,5-di-tert.-butylphenyl-n-undecyl-ketone, M.P. 48–49°;
4-hydroxy-3,5-di-tert.-butylphenyl-n-pentadecyl-ketone, M.P. 57–58°;
4-hydroxy-3,5-di-tert.-butylphenyl-nonadecyl-ketone, M.P. 74–76°;
4-hydroxy-3,5-di-tert.-butylphenyl-heneicosyl-ketone, M.P. 66–69°;
4-hydroxy-3,5-di-tert.-butylphenyl-pentacosyl-ketone, M.P. 46–47°;
4-hydroxy-3,5-di-tert.-butylphenyl-benzyl-ketone, M.P. 122–124°;
4-hydroxy-3,5-di-tert.-butylphenyl-2'-phenylethyl-ketone, M.P. 87–88°;
4-hydroxy-3,5,4'-tert.-butyl-benzophenone, M.P. 123–125°;
4-hydroxy-3,5-di-tert.-butylphenyl-1'-oxo-2'-oxadecyl-ketone, B.P. 244–249°/9 mm.;
4-hydroxy-3,5-di-tert.-butylphenyl-1'-oxo-2'-oxatetradecyl-ketone, B.P. 255–265°/8 mm.;
4-hydroxy-3,5-di-tert.-butylphenyl-1'-oxo-2'-oxaeicosyl-ketone, M.P. 49–50°;
4-hydroxy-3,5-di-tert.-butylphenyl-2'-(4-methoxy-3,5-di-tert.-butylphenyl)-ethyl-ketone, M.P. 156–158°;
4-hydroxy-3,5-di-tert.-butyl-phenyl-5'-(4-hydroxy-3,5-di-tert.-butylphenyl)-5'-oxo-amyl-ketone, M.P. 145°;
4-hydroxy-3,5-di-tert.-butyl-2'-methoxybenzophenone, M.P. 89–90°.

Example 2

To a solution of 7.0 g. of sodium in 250 ml. of anhydrous methanol is added 63.0 g. of 2,6-di-tert.-butylphenol. The methanol is distilled off and the residue is heated under a vacuum to 80–100° with stirring until powder-dry. Thereafter, the powder is suspended in 500 ml. of dry dioxane and with stirring a solution of 53 g. of pelargonic acid chloride in 100 ml. of dioxane is added dropwise. The reaction mixture is stirred for another hour, 500 ml. of water is added, the reaction mixture is extracted twice with 400 ml. portions of ether. The extracts are dried over sodium sulfate and the ether is distilled off, the last traces being removed under a vacuum. The residue is recrystallized with petroleum ether (boiling range 90–110°). Yield: 57 g. of 4-hydroxy-3,5-di-tert.-butylphenyl-n-octyl-ketone, M.P. 84°.

Example 3

To a solution of 30 g. of 4-hydroxy-3,5-di-tert.-butylphenyl-2'-chloroethyl-ketone (M.P. 107.5–109°), produced analogously to Example 1 by reacting 2,6-di-tert.-butyl-phenol with acrylic acid chloride in the presence of AlCl₃, in 300 ml. of methanol, is added a solution of 6 g. of NaOCH₃ in 50 ml. of methanol dropwise at room temperature with stirring. Thereafter, the reaction mixture is heated for 30 minutes at its boiling point, concentrated to about 50 ml., and 500 ml. of water is added thereto. The mixture is extracted with ether, the extracts are dried over sodium sulfate, and the ether is distilled off. The residue is recrystallized from petroleum ether. There is obtained 19.8 g. of 4-hydroxy-3,5-di-tert.-butyl-phenyl-3'-oxa-butyl-ketone, M.P. 68–69°.

Analogously, the following compounds are produced:

4-hydroxy-3,5-di-tert.-butylphenyl-3'-oxaundecyl-ketone;
4-hydroxy-3,5-di-tert.-butylphenyl-2'-dimethylaminoethyl-ketone, M.P. 86–87°;
4-hydroxy-3,5-di-tert.-butylphenyl-acetoxymethyl-ketone, M.P. 103–105°;
4-hydroxy-3,5-di-tert.-butylphenyl-morpholinomethyl-ketone, M.P. 119–121°;
4-hydroxy-3,5-di-tert.-butylphenyl-2'-morpholinoethyl-ketone, M.P. 102–104°;
4-hydroxy-3,5-di-tert.-butylphenyl-phenoxymethyl-ketone;
4-hydroxy-3,5-di-tert.-butylphenyl-2'-phenyl-2'-thiaethyl-ketone;

4-hydroxy-3,5-di-tert.-butylphenyl-2'-phenyl-2'-azapropyl-ketone;
4-hydroxy-3,5-di-tert.-butylphenyl-5'-carbethoxy-3'-thia-amyl-ketone, M.P. 88–90°;
4-hydroxy-3,5-di-tert.-butylphenyl-3'-thiapentadecyl-ketone;
4-hydroxy-3,5-di-tert.-butylphenyl-1'-carbethoxy-3'-oxa-amyl-(2')-ketone, M.P. 55.5–57.5°;
4-hydroxy-3,5-di-tert.-butylphenyl-6'-(4-hydroxy-3,5-di-tert.-butylphenyl)-6'-oxo-3'-thiahexyl-ketone, M.P. 159–161°;
4-hydroxy-3,5-di-tert.-butylphenyl-2'-dodecylmercapto-cyclohexyl-ketone;
4-hydroxy-3,5-di-tert.-butylphenyl-4'-dodecylmercapto-cyclohexyl-ketone.

Example 4

A solution of 71 g. of 4 - hydroxy - 3,5-di-tert.-butyl-4'-nitrobenzophenone, produced analogously to Example 1 by reacting 2,6-di-tert.-butyl-phenol with p-nitrobenzoyl chloride in the presence of AlCl$_3$, in 400 ml. of acetic acid is added dropwise over a period of 45 minutes to a slightly heated mixture of 60 g. of iron filings, 100 ml. of water, and 10 ml. of concentrated hydrochloric acid. Thereafter, the mixture is boiled under reflux for 1 hour, made weakly alkaline with sodium hydroxide, and the thus-formed 4 - hydroxy - 3,5 - di-tert.-butyl-4'-amino-benzophenone is distilled off with steam. The distillate is extracted with ether, the extract is dried with magnesium sulfate and the solvent evaporated therefrom. The residue (49 g.) is recrystallized from methanol.

Analysis.—$C_{21}H_{27}NO_2$: Calculated (percent): C, 77.50; H, 8.36; N, 4.30. Found (percent): C, 77.20; H, 8.50; N, 4.20.

Example 5

To a solution of 32 g. of 4-hydroxy-3,5-di-tert.-butyl-4'-aminobenzophenone in 500 ml. of ethanol is added, at 40–50° C. over a period of 45 minutes, a solution of 17 g. of ethyl bromide in 50 ml. of ethanol. Thereafter, the mixture boiled under reflux for 30 minutes, and the alcohol is distilled off. The residue is taken up in 150 ml. of 12% potassium hydroxide solution, and with vigorous stirring, mixed in incremental portions with 35 g. of toluenesulfochloride. The reaction mixture is briefly heated to the boiling point, acidified with hydrochloric acid, and the thus-precipitated p-toluenesulfamide of 4-hydroxy - 3,5 - di-tert.-butyl-4'-ethylaminobenzophenone (21.5 g.) is filtered off. The filtrate is again rendered alkaline with KOH and extracted with ether. The ether extract is dried over sodium sulfate and evaporated, and the residue is recrystallized from ethanol. Yield: 13 g. of 4 - hydroxy - 3,5-di-tert.-butyl-4'-diethylaminobenzophenone.

The filtered-off p-toluenesulfamide of 4-hydroxy-3,5-di-tert.-butyl-4'-ethylaminobenzophenone is boiled under reflux for 30 minutes with 100 ml. of 30% hydrobromic acid. The mixture is made alkaline with a solution of sodium hydroxide and worked up as described above. Yield: 12.2 g. of 4-hydroxy-3,5-di-tert.-butyl-4'-ethylaminobenzophenone.

Example 6

At 80° and with vigorous stirring, 10.2 ml. of bromine is added dropwise within 20 minutes to a mixture of 31.8 g. of 2,6-di-tert.-butyl-4-octyl phenol in 100 ml. of acetic acid (80%). The reaction mixture is allowed to cool and then poured into 500 ml. of ice water. The resulting mixture is extracted with chloroform and the extracts are washed with sodium bicarbonate solution and water, dried over calcium chloride, and the chloroform completely distilled off. The oily residue is chromatographed on neutral aluminum oxide/chloroform. There is thus obtained 13.6 g. of 4-hydroxy-3,5-di-tert.-butylphenyl-n-heptyl-ketone, M.P. 91–92°.

The preceding examples can be repeated wtih similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. 4-Hydroxy - 3,5 - di-tert.-butyl-phenones of the formula

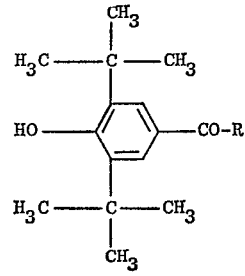

wherein R is selected from the group consisting of alkyl of 4–25 carbon atoms; alkyl of up to 25 carbon atoms having an —O— ether, —CO— keto or —COCO— diketo group in the chain; cyclohexyl, cyclopentyl, and the corresponding mono- and disubstituted groups bearing on a ring carbon atom one of —$R_1$ and —$OR_1$; and mono- and poly-substituted phenyl bearing on a ring carbon atom alkyl of 1 to 18 carbon atoms, $R_1$ being selected from the group consisting of H and alkyl of up to 18 carbon atoms.

2. Compounds of claim 1 selected from the group consisting of 4-hydroxy-3,5-di-tert.-butylphenyl-n-butyl-ketone;
4-hydroxy-3,5-di-tert.-butylphenyl-isobutyl-ketone;
4-hydroxy-3,5-di-tert.-butylphenyl-tert.-butyl-ketone;
4-hydroxy-3,5-di-tert.-butylphenyl-neopentyl-ketone;
4-hydroxy-3,5-di tert.-butylphenyl-heptyl-ketone;
4-hydroxy-3,5-di-tert.-butylphenyl-n-octyl-ketone;
4-hydroxy-3,5-di-tert.-butylphenyl-n-undecyl-ketone;
4-hydroxy-3,5-di-tert.-butylphenyl-n-pentadecyl-ketone;
4-hydroxy-3,5-di-tert.-butylphenyl-n-heptadecyl-ketone;
4-hydroxy-3,5-di-tert.-butylphenyl-nonadecyl-ketone;
4-hydroxy-3,5-di-tert.-butylphenyl-heneicosyl-ketone; and
4-hydroxy-3,5-di-tert.-butylphenyl-pentacosyl-ketone.

3. Compounds of claim 1 selected from the group consisting of
4-hydroxy-3,5-di-tert.-butylphenyl-cyclopentyl-ketone;
4-hydroxy-3,5-di-tert.-butylphenyl-cyclohexyl-ketone;
4-hydroxy-3,5-di-tert.-butylphenyl-2'-methoxycyclohexyl-ketone;
4-hydroxy-3,5-di-tert.-butylphenyl-4'-methoxycyclohexyl-ketone; and
4-hydroxy-3,5-di-tert.-butylphenyl-4'-tert.-butylcyclohexyl-ketone.

4. Compounds of claim 1 selected from the group consisting of 4-hydroxy - 3,5,4' - tri-tert.-butyl-benzophenone; 4-hydroxy - 3,5 - di-tert.-butyl-2'-methoxy-benzophenone.

5. Compounds of claim 1 selected from the group consisting of 4-hydroxy-3,5-di-tert.-butylphenyl-3'-oxabutyl-ketone; and 4-hydroxy - 3,5 - di-tert.-butylphenyl-3'-oxa-undecyl-ketone.

6. The compound of claim 1 wherein R is

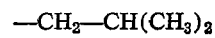

7. The compound of claim 1 wherein R is —C(CH$_3$)$_3$.
8. The compound of claim 1 wherein R is —C$_6$H$_{11}$.
9. The compound of claim 1 wherein R is

—(CH$_2$)$_6$—CH$_3$

10. The compound of claim 1 wherein R is

—(CH$_2$)$_7$—CH$_3$

11. The compound of claim 1 wherein R is

—(CH$_2$)$_{10}$—CH$_3$

12. The compound of claim 1 wherein R is

—(CH$_2$)$_{14}$—CH$_3$

13. The compound of claim 1 wherein R is

—(CH$_2$)$_{16}$—CH$_3$

14. The compound of claim 1 wherein R is

—(CH$_2$)$_{18}$—CH$_3$

15. The compound of claim 1 wherein R is

—(CH$_2$)$_{20}$—CH$_3$

16. The compound of claim 1 wherein R is

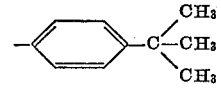

17. The compound of claim 1 wherein R is

—CH$_2$—CH$_2$—O—CH$_3$

References Cited

UNITED STATES PATENTS

| | | | |
|---|---|---|---|
| 2,903,487 | 9/1959 | Coffield | 260—591 |
| 3,215,530 | 11/1965 | Riebel et al. | 260—591 |
| 3,403,967 | 10/1968 | Stanley | 260—591 |
| 3,592,931 | 6/1971 | Duennenberger et al. | 260—591 |

FOREIGN PATENTS

| 475,710 | 9/1969 | Switzerland | 260—591 |
|---|---|---|---|

DANIEL D. HORWITZ, Primary Examiner

U.S. Cl. X.R.

99—163; 252—45, 51, 52, 56; 260—45.85, 592, 488, 570.8, 590, 473, 247.7, 470, 45.95, 398.5, 459, 45.8